2,973,364

1-(2-THENOYL)ALKYL-4-ARYL-1,2,3,6-TETRA-HYDROPYRIDINES

Paul Adriaan J. Janssen, Antwerpse Steenweg 16', Vosselaar, near Turnhout, Belgium No Drawing. Filed Mar. 26, 1959, Ser. No. 801,992

5 Claims. (Cl. 260—294.8)

The present invention relates to a new group of tetrahydropyridine derivatives and more particularly to 1-(2-thenoyl)alkyl-4-aryl-1,2,3,6-tetrahydropyridines of the general structural formula

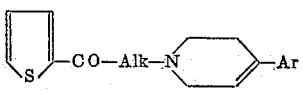

and the pharmaceutically useful non-toxic salts thereof, wherein Ar is a monocyclic aryl radical, preferably of less than nine carbon atoms, and Alk is a lower alkylene radical.

The radical Ar can represent halophenyl radicals such as fluorophenyl, chlorophenyl, bromophenyl, and iodophenyl and monocyclic aromatic hydrocarbon radicals such as phenyl, tolyl, and xylyl.

The radical Alk can represent a lower alkylene radical such as methylene, ethylene, propylene, methylpropylene, tetramethylene, pentamethylene, and hexamethylene, but is preferably trimethylene.

The organic bases of this invention form pharmaceutically acceptable non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of this invention can be prepared by the condensation of an thenoylalkyl halide of the formula

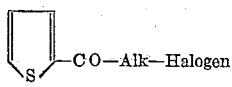

with an appropriately selected 4-aryl-1,2,3,6-tetrahydropyridine. The reaction can be carried out in an inert solvent such as an aromatic hydrocarbon, e.g. benzene, toluene, xylene; a lower alkanol e.g. ethanol, propanol, butanol; and a lower alkanone, e.g. butanone, pentanone. The reaction rate can be accelerated by the use of elevated temperatures.

The compounds of this invention can also be prepared by reacting an appropriately selected ω-(4-aryl-1,2,3,6-tetrahydropyridine)alkanonitrile with a thenoyl magnesium halide, decomposing the complex, and recovering the product. The ω-(4-aryl-1,2,3,6-tetrahydropyridine)alkanonitrile required for this reaction can be prepared by the condensation of a ω-haloalkanonitrile with an appropriately selected 4-aryl-1,2,3,6-tetrahydropyridine.

Alternatively, the compounds can be prepared by condensing a thenoyl halide with the sodium salt of an alkyl acetoacetate to give the corresponding α-thenoyl acetate ester, which is then condensed with an appropriately selected 1-(ω-haloalkyl)-4-aryl-1,2,3,6-tetrahydropyridine followed by saponification and decarboxylation.

The thenoylalkyl halides used as intermediates can be conveniently prepared by the Friedel-Crafts reaction, employing, for example, γ-chlorobutyryl chloride and thiophene. Mild Friedel-Crafts conditions can be used; thus a milder catalyst such as stannic chloride can be used rather than aluminum chloride.

The intermediate 4-aryl-1,2,3,6-tetrahydropyridines can be conveniently prepared by condensing α-methylstyrene, or an appropriately substituted derivative, with ammonia and formaldehyde, followed by acid hydrolysis.

The compounds of this invention have useful pharmacological properties. They are depressants of the central nervous system. In small doses they exhibit marked tranquilizing effects. They are also anti-epileptic, antipyretic, hypnotic, and analgesic agents.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight. Temperatures are expressed in degrees centigrade (° C.), and pressures are expressed in millimeters of mercury (mm.).

Example 1

A mixture of 84 parts of thiophene, 141 parts of γ-chlorobutyryl chloride, and 870 parts of benzene is cooled to about 0° C. While this temperature is maintained 260 parts of stannic chloride are added over a 2 hour period. After the addition is completed, the cooling bath is removed and the stirring is continued for about an hour. The reaction mixture is then poured into a mixture of 60 parts of concentrated hydrochloric acid and 450 parts of ice water. The organic layer is separated, washed with water, dried over anhydrous calcium chloride, and filtered. The filtrate is concentrated under reduced pressure. The residue is distilled to yield 2-(γ-chlorobutyryl)thiophene which boils at 144–146° C. at 11 mm. of pressure.

Example 2

A solution of 95 parts of methyl bromide in 356 parts of ether is added portionwise to a refluxing suspension of 24 parts of magnesium in 214 parts of ether. The mixture is refluxed for 2 hours, and then 92 parts of p-fluoroacetophenone are added in the course of 90 minutes. The refluxing is continued for 3 hours, after which the mixture is stirred for 24 hours at room temperature. The Grignard complex is destroyed by the addition of ammonium chloride and 10% hydrochloric acid solution. The mixture is extracted with ether, and the ether extracts are washed with 10% sulfuric acid solution and then with water. The extracts are dried over anhydrous calcium chloride, filtered, and concentrated in vacuo to remove the solvent. About 0.5 part of hydroquinone is added to the residue which is then heated to a temperature of 100–110° C. under a pressure of 50 mm. The distillate is extracted with ether and the ether extracts are dried over anhydrous calcium chloride and filtered. A small quantity of hydroquinone is added to the ether solution. The solution is fractionated by distillation to yield p-fluoro-α-methylstyrene boiling at 93–94° C. at 80 mm. pressure.

Example 3

A mixture of 856 parts of ammonium chloride and 3000 parts of 36% formaldehyde is stirred and heated to about 60° C. With cooling to maintain this temperature, 944 parts of α-methylstyrene are added slowly. After the addition is completed, the mixture is stirred at room temperature until the temperature of the reaction mixture drops to about 40° C. After 2000 parts of methanol are added, the stirring is continued for 20 hours. The methanol is removed in vacuo, and the residue is diluted with 3000 parts of concentrated hydrochloric acid. For 4 hours, the mixture is heated with stirring at a temperature of 100° C. The mixture is cooled, diluted with 2000 parts of water, and made alkaline with 15 normal sodium hydroxide solution. The reaction mixture is extracted with benzene, and the benzene extracts are dried over anhydrous potassium carbonate and filtered. The benzene is removed from the filtrate. The remaining residue is distilled in vacuo to yield 4-phenyl-1,2,3,6-tetrahydropyridine which boils at 97–112° C. at 1 mm. pressure.

This base is dissolved in benzene. Dry, gaseous hydrogen chloride is passed through the solution, whereupon there precipitates the hydrochloride which is collected on a filter. The 4-phenyl-1,2,3,6-tetrahydropyridine hydrochloride melts at about 199–202° C.

*Example 4*

Substitution of an equimolar amount of α-chloroacetyl chloride for the γ-chlorobutyryl chloride in Example 1 yields the white, prismatic crystals of 2-(α-chloroacetyl)-thiophene.

Substitution of an equimolar amount of m-bromoacetophenone for the p-fluoroacetophenone in Example 2 yields m-bromo-α-methylstyrene boiling at 99–102° C. at 11 mm. pressure.

Substitution of an equimolar amount of m-bromo-α-methylstyrene for the α-methylstyrene in Example 3 yields 4-(m-bromophenyl)-1,2,3,6-tetrahydropyridine hydrochloride melting at 261–267° C.

In a bomb a mixture of 13.2 parts of 2-(α-chloroacetyl) thiophene, 36 parts of 4-(m-bromophenyl)-1,2,3,6-tetrahydropyridine, and 0.1 part of potassium iodide in 120 parts of toluene is heated for 72 hours at a temperature of 145–150° C. The contents of the bomb are cooled and then filtered. The remaining solid is triturated with an equal parts mixture of water and ether. The ether layer is separated and added to the filtrate from the original reaction mixture. The combined solutions are dried over anhydrous potassium carbonate and filtered. Anhydrous hydrogen chloride gas is passed through the solution. The solid thus precipitated is recovered and recrystallized from a mixture of 2-propanol and actone. In this manner there is obtained the hydrochloride of 1-[α-2-thenoyl)methyl]-4-(m-bromophenyl) 1,2,3,6 - tetrahydropyridine which is a white crystalline compound. The structural formula is

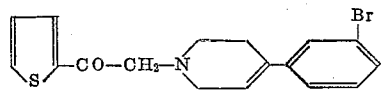

*Example 5*

In an open flask a mixture of 15.5 parts of 2-(γ-chlorobutyryl)thiophene, 24 parts of 4-phenyl-1,2,3,6-tetrahydropyridine, and 0.1 part of potassium iodide in 100 parts of toluene is heated under reflux for about 70 hours. The contents of the flask are cooled and then filtered. The solid residue is triturated with a mixture of 100 parts of water and 100 parts of ether. The ether layer is separated and added to the filtrate from the original reaction mixture. The combined solution is dried over anhydrous potassium carbonate and filtered. Dry, gaseous hydrogen chloride is introduced into the solution. The precipitated salt is collected on a filter and recrystallized from a mixture of 2-propanol and acetone to yield the hydrochloride of 1-[γ-(2-thenoyl)propyl]-4-phenyl-1,2,3,6-tetrahydropyridine melting at 200.4–202.6° C.

Substitution of an equimolar amount of β-methyl-γ-chlorobutyryl chloride for the γ-chlorobutyryl chloride in Example 1 yields the colorless needles of 2-(β-methyl-γ-chlorobutyl)thiophene.

Substitution of 16.7 parts of 2-(β-methyl-γ-chlorobutyryl)thiophene for the 2-(γ-chlorobutyryl) thiophene in the preceding procedure yields the white, prismatic crystals of 1 - [β-methyl-γ-(2-thenoyl)propyl]-4-phenyl-1,2,3,6-tetrahydropyridine hydrochloride.

*Example 6*

Substitution of an equimolar amount of p-fluoro-α-methylstyrene for the α-methylstyrene in Example 3 yields 4-(p-fluorophenyl)-1,2,3,6-tetrahydropyridine boiling at 139–141° C. at 4 mm. pressure.

Substitution of 26.7 parts of 4-(p-fluorophenyl)-1,2,3,6-tetrahydropyridine in Example 5 yields 1-[γ-(2-thenoyl)-propyl]-4-(p-fluorophenyl)-1,2,3,6,-tetrahydropyridine hydrochloride melting at 178–180.5° C.

*Example 7*

A solution of 192 parts of p-chlorobromobenzene in 124 parts of ether is added dropwise to a suspension of 24 parts of magnesium in 214 parts of ether. The mixture is refluxed for 2 hours. The mixture is cooled to about 5° C., and 39 parts of acetone are added in the course of 2 hours. The mixture is stirred for 24 hours at room temperature and then decomposed with ammonium chloride solution and 10% hydrochloric acid. The solution is extracted with ether. The ether layer is washed with 10% sulfuric acid and then with water. This solution is dried over anhydrous calcium chloride, filtered, and concentrated in vacuo. The residual carbinol is heated under reduced pressure of about 50 mm. in the presence of 0.5 part of hydroquinone for 2 hours on an oil bath at a temperature of 100–110° C. The styrene and water are distilled off. The product is extracted with ether. The ether extract is dried over anhydrous calcium chloride, filtered, and fractionated over hydroquinone to yield p-chloro-α-methylstyrene boiling at 83–85° C. at 15 mm. pressure.

Substitution of an equimolar amount of p-chloro-α-methylstyrene for the α-methylstyrene in Example 3 yields 4-(p-chlorophenyl)-1,2,3,6-tetrahydropyridine boiling at 157–160° C. at 8 mm. pressure.

Substitution of 29.3 parts of 4-(p-chlorophenyl)-1,2,3,6-tetrahydropyridine for the 4-phenyl-1,2,3,6-tetrahydropyridine in Example 5 yields 1-[γ-(2-thenoyl)-propyl]-4-(p-chlorophenyl) - 1,2,3,6 - tetrahydropyridine hydrochloride melting at 207–208.5° C.

*Example 8*

Substitution of an equimolar amount of p-methylacetophenone for the p-fluoroacetophenone in Example 2 yields p-methyl-α-methylstyrene boiling at 72–74° C. at 13 mm. pressure.

Substitution of an equimolar amount of p-methyl-α-methylstyrene for the α-methylstyrene in Example 3 yields 4-(p-tolyl)-1,2,3,6-tetrahydropyridine hydrochloride melting at 192.4–194° C.

Substitution of 26.1 parts of 4-(p-tolyl)-1,2,3,6-tetrahydropyridine for the 4-phenyl-1,2,3,6-tetrahydropyridine in Example 5 yields 1-[γ-(2-thenoyl)propyl]-4-(p-tolyl)-1,2,3,6-tetrahydropyridine hydrochloride melting at 200–203° C.

*Example 9*

Substitution of an equimolar amount of o,p-dimethylacetophenone for the p-fluoroacetophenone in Example 2 yields o,p-dimethyl-α-methylstyrene boiling at 79–83° C. at 17 mm. pressure.

Substitution of an equimolar amount of o,p-dimethyl-α-methylstyrene for the α-methylstyrene in Example 3 yields 4-(o,p-xylyl)-1,2,3,6-tetrahydropyridine hydrochloride melting at about 216.8–220° C.

Substitution of 28.2 parts of 4-(o,p-xylyl)-1,2,3,6-tetrahydropyridine for the 4-phenyl-1,2,3,6-tetrahydropyridine in Example 5 yields 1-[γ-(2-thenoyl)propyl]-4-(o,p-xylyl)-1,2,3,6-tetrahydropyridine hydrochloride melting at 163–163.6° C.

*Example 10*

Substitution of an equimolar amount of p-bromoacetophenone for the p-fluoroacetophenone in Example 2 yields p-bromo-α-methylstyrene boiling at 103–106° C. at 15 mm. pressure.

Substitution of an equimolar amount of p-bromo-α-methylstyrene for the α-methylstyrene in Example 3 yields 4-(p-bromophenyl)-1,2,3,6-tetrahydropyridine hydrochloride melting at 243.5–245° C.

Substitution of 36 parts of 4-(p-bromophenyl)-1,2,3,6-tetrahydropyridine for the 4-phenyl-1,2,3,6-tetrahydropyridine in Example 5 yields 1-[γ-(2-thenoyl)propyl]-4-(p-bromophenyl)-1,2,3,6 - tetrahydropyridine hydrochloride melting at 218–220° C.

*Example 11*

Substitution of an equimolar amount of δ-chlorovaleryl chloride for the γ-chlorobutyryl chloride in Example 1 yields 2-(δ-chlorovaleryl) thiophene.

Substitution of 16.5 parts of 2-(δ-chlorovaleryl)-thiophene for the 2-(γ-chlorobutyryl)thiophene in Example 5 yields the colorless needles of 1-[δ-(2-thenoyl)butyl]-4-phenyl-1,2,3,6-tetrahydropyridine hydrochloride.

What is claimed is:

1. A compound of the formula

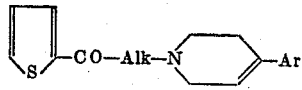

wherein Ar is a member of the class consisting of phenyl, halophenyl, tolyl, and xylyl, and wherein Alk is lower alkylene.

2. A compound of the formula

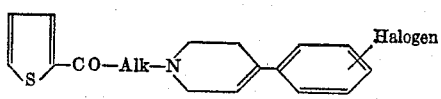

wherein Alk is a lower alkylene.

3. 1-[γ-(2-thenoyl)propyl]-4-(p-fluorophenyl)-1,2,3,6-tetrahydropyridine.

4. 1-[γ-(2-thenoyl)propyl] - 4 - (p-tolyl)-1,2,3,6-tetrahydropyridine.

5. 1-[γ-(2-thenoyl)propyl]-4-phenyl-1,2,3,6-tetrahydropyridine.

References Cited in the file of this patent

Levine et al.: Chem. Abstracts, vol. 47, col. 8077 (1953).